United States Patent [19]

Mackinlay et al.

[11] Patent Number: 5,438,430
[45] Date of Patent: Aug. 1, 1995

[54] PAPER USER INTERFACE FOR IMAGE MANIPULATIONS SUCH AS CUT AND PASTE

[75] Inventors: Jock D. Mackinlay, Palo Alto; Walter A. L. Johnson, Santa Clara, both of Calif.

[73] Assignee: Xerox Corporation, Stamford, Conn.

[21] Appl. No.: 950,564

[22] Filed: Sep. 25, 1992

[51] Int. Cl.⁶ .......................................... H04N 1/387
[52] U.S. Cl. .................... 358/450; 358/448; 358/451; 358/453
[58] Field of Search ............... 368/468, 400, 260, 401, 368/280, 402, 293, 403, 287, 404, 405, 406, 407, 450; 355/204, 6, 210, 200, 203, 326; 395/400, 425

[56] References Cited

U.S. PATENT DOCUMENTS

| | | | |
|---|---|---|---|
| 4,814,898 | 3/1989 | Arimoto et al. | 358/260 |
| 4,876,571 | 10/1989 | Nakamura et al. | 355/210 |
| 4,987,447 | 1/1991 | Ojha | 355/204 |
| 5,126,858 | 6/1992 | Kurogane et al. | 358/450 |
| 5,153,744 | 10/1992 | Nobuta | 358/400 |
| 5,161,037 | 11/1992 | Saito | 358/468 |
| 5,282,274 | 1/1994 | Liu | 395/400 |

Primary Examiner—Paul Ip
Attorney, Agent, or Firm—Oliff & Berridge

[57] ABSTRACT

A reprographic method for making a output document having a desired image from an input document having an input image includes scanning an instruction page containing an image processing command. The image processing command contained on the instruction page is decoded, and subsequently at least a portion of the input image is scanned. The output document is then produced from the scanned at least a portion of the input image in accordance with the decoded image processing command. The image processing commands can be such as cut, paste, mask, crop, enlarge, reduce, reorient, lighten, darken or the like that change the form or appearance of the actual image. In addition, the image manipulation commands can be such as commands to control special operational modes for differing input image types, such as, for example, photographs or half-tone images, the number of output document copies to be produced, the output type, color, stock, or other command that controls the output form of the image. The image processing commands can be in the form of full-page forms, or self-stick removable notes that can be placed directly on the input document, in many instances.

11 Claims, 11 Drawing Sheets

FIG.1

Cut Image
 Instructions: Place form over original and trace rectangle around area to be be cut. When tracing cannot fit below, check here ▹ ☐ and trace rectangle on a clean sheet. Form (and tracings) preceed original in copy job.
Image: Last A B C D E
☐ ☐ ☐ ☐ ☐ ☐  /52
W. Johnson J. Mackinlay Xerox PARC          XEROX          © Copyright 1990 Xerox Corporation
FIG.3

 
FIG.5

Crop/Mask

✗ Instructions: Place form over original. trace a line for a crops and a rectangle for a mask. Put "x"s in area to be removed. (see Examples). When marks cannot fit below, check here ▷ ☐ and trace marks on a clean sheet. Form (and marks) preceed original in copy job.

Examples: Top Crop:  Mask: 

Extent: Next original ☐  Rest of job ☐

Left crop:   Right Crop: 

72

70

W. Johnson J. Mackinlay Xerox PARC       XEROX       © Copyright 1990 Xerox Corporation

Copy Form Job

☒

Instructions: Use tihs form to make copies of forms and to get new forms. All other forms will be ignored when this form is included at the front of a copy job.

| Quantity: | One ☐ ⊔⊓⊔⊓⊔ | 87 |

| Basic Copy Job — For basic copier control. | No ☐ Include ☐ | 80 |
| Copy Form Job — For copying and getting forms. | No ☐ Include ☐ | 81 |
| Cut Image — For tracing an image to be pasted. | No ☐ Include ☐ | 82 |
| Paste Image — For including a cut image in a traced area. | No ☐ Include ☐ | 83 |
| Crop/Mask — for tracing areas to be removed. | No ☐ Include ☐ | 84 |
| Inserts — For including covers and separators. | No ☐ Include ☐ | 85 |

| Other — For site specific forms. | Form identity number ⊔⊓⊔⊓⊔⊓⊔ | 89 |

XEROX

W. Johnson J. Mackinlay Xerox PARC      © Copyright 1990 Xerox Corporation

FIG. 9

PAPER USER INTERFACE FOR IMAGE MANIPULATIONS SUCH AS CUT AND PASTE

NOTICE OF COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to improvements in methods and techniques for image processing, and, more particularly, to improvements in image processing methods and techniques used in conjunction with system reprographic devices, and, still more particularly, to improved user interfaces to system reprographic devices.

2. Relevant Art

Advances in reprographic systems have been manifold. Almost every office now has at least one copy machine or other machine that uses a reprographic mechanism in one form or another, and many companies have entire departments for copy production. Presently, the most wide-spread copier is a light/lens system in which an image of a document is scanned by light and focused by the lens to cause an electrostatic charge redistribution on a drum for transfer to an output document. The charge on the output document attracts a toner or other media that can be permanently bonded, melted, or affixed to the paper. The process can be repeated as many times as necessary to produce a number of output copies from a single original or input document. Additionally, numerous original or input documents can be sequentially scanned to form single or double sided copies on the output document or documents. By moving the lens, the input image can be enlarged or reduced on the output document, as desired.

In addition, recent advances in reprographic systems provide for electronic digital copying. When the image is scanned, an electronic digital representation of the image is generated and stored in an electronic memory from which the image can be retrieved, manipulated, merged with other images, or otherwise modified as desired.

Currently in the operation of a reprographic system, a user is required to push buttons or dials to program the machine to perform the desired functions. For example, in a typical reprographic system, a user is required to enter the number of copies that are desired to be made from an input document. If the image of the input document is desired to be enlarged or reduced, the user must push buttons to select a desired percentage of enlargement or reduction. Usually adjustments also are provided for increasing the darkness or lightness of the image of the output document by various preselected amounts.

In many machines, particularly those in which an electronic digital representation of the image is formed, the rotational orientation of the output image can be selectably adjusted. Nevertheless, the copy job must be individually entered or programmed in advance of the submission of the job to the machine. Although such copy instruction entries are not generally unduly burdensome, machine time is required that could otherwise be productively utilized in making copies. Also, more sophisticated image processing capabilities such as cut, paste, mask, and the like are difficult or impossible to accomplish on presently available reprographic systems through mere instruction entry onto the control apparatuses of the machine.

In some instances in which an operator is provided, for example in larger companies that have separate copy center departments, instructions must be given to the operator for manual entry or programming of the machine. The existence of a "middle man" between the person requesting copies and the machine gives rise to an increased possibility of error in the communication of the desired instructions to the machine. Additionally, typically written instructions are often given to the operator. Thus, the person desiring that copies be made must prepare written instructions, thereby resulting in duplicative effort vis-a-vis the present invention.

SUMMARY OF THE INVENTION

In light of the above, therefore, it is an object of the invention to provide an improved method for text manipulation.

It is another object of the invention to provide an improved method of the type described that can be employed in conjunction with reprographic apparatuses that produce paper or electronic images from an original paper image.

It is another object of the invention to provide an improved method of the type described that reduces user expertise requirements in operating machinery for manipulating text and other written or paper images.

It is another object of the invention to provide an improved method of the type described that enables user directions to be emplaced on a document associated with an image to be manipulated for instructions as to the desired manipulation; for example, cut, paste, and other image manipulating techniques can be indicated by a glyph, hand written notation, or other indicia indicating the document text or image portion to be manipulated.

It is another object of the invention to provide an improved method for inputting instructions to a light-lens copier by use of a document that is read by the copier, without requiring manual input to the copier instruction interface.

It is yet another object of the invention to provide user interface forms on paper to enable user instructions to be inputted to a copier to control its various functions.

It is yet another object of the invention to provide an improved method and apparatus for image manipulation that specifies the image manipulation operations using a paper user-interface.

It is another object of the invention to provide a medium for specifying user instructions for machine image manipulation that provides clearer image manipulation specifications less prone to error than direct machine input instructions.

It is another object of the invention to provide a method of the type described that can be used to specify image manipulations in a reprographic system, or the like.

It is another object of the invention to provide an image manipulating method such as a cut and paste method that is not destructive of the original image.

It is yet another object of the invention to provide a paper user-interface to a reprographic system that enables batching and queuing of copy jobs, separating users time from actual processing time, and streamlining document flow through reprographic systems.

These and other objects, features and advantages of the invention will be apparent to those skilled in the art from the following detailed description of the invention, when read in conjunction with the accompanying drawings and appended claims.

According to the invention, a method is presented for image manipulation that specifies the operations using a paper-user interface, i.e., marks on paper that, when scanned and recognized, are interpretable as commands for operations on the image. Standard operations such as cut and paste, crop/mask, insert, as well as unique operations are provided. In one embodiment, small self-stick removable overlays placed on an input image are used to insert machine-readable marks or glyphs that encode instructions for complex operations. The primary advantage of a paper user interface method is transparency of specification. Paper-based commands can be combined naturally with originals to specify image manipulations. A stack of originals and commands becomes a representation of the desired result, making specification clearer and less prone to error.

The paper user interface method has other advantages over traditional paper methods, such as scissors and glue, which involve isolated destructive operations. For example, a paper user interface allows a cut image to be pasted at many differing scales and orientations. Paper user interface specification can also be developed incrementally without having to redo every cut and paste.

The paper user interface method also has advantages over computer-based methods, many of which are widely commercially available, that require the user to learn the software's user interface. This may also consume a large amount of work station display time. Rather, the paper user interface method is similar to familiar paper methods and only requires pen and paper.

Further, in accordance with a broad aspect of the invention a reprographic method for making a output document having a desired image from an input document having an input image is presented. The method includes scanning an instruction page containing an image processing command. The image processing command contained on the instruction page is decoded, and subsequently at least a portion of the input image is scanned. The output document is then produced from the scanned portion of the input image in accordance with the decoded image processing command. The input and output documents can be multipaged documents.

The image processing commands can be such as cut, paste, mask, crop, enlarge, reduce, reorient, lighten, darken or the like that change the form or appearance of the actual image. In addition, the image manipulation commands can be such as commands to control the type of reprographic imaging performed for input documents that differ from standard input images, for example, photographs or half-tone images, the number of output document copies to be produced, the output type, color, stock, or other command that controls the output form of the image.

The image processing commands can be in the form of full-page forms, or self-stick removable notes that can be placed directly on the input document, in many instances.

BRIEF DESCRIPTION OF THE DRAWING

The invention is illustrated in the accompanying drawings, in which:

FIG. 1 is an example of a "Basic Copy Job" form, in accordance with a preferred embodiment of the method of the invention.

FIG. 3 is an example of a "Cut Image" form, in which the image can be labeled for identification for subsequent multiple or out-of-sequence uses, in accordance with a preferred embodiment of the method of the invention.

FIG. 5 is an example of a "Paste Image" form to instruct the pasting of in which a previously named image, and in which the scale position and rotational orientation also can be selected, in accordance with a preferred embodiment of the method of the invention.

FIG. 6 is a "Crop/Mask" form, in accordance with a preferred embodiment of the method of the invention.

FIG. 8 is an "Insert" form in which the type, color, and stock of the insert and output documents can be specified, in accordance with a preferred embodiment of the method of the invention.

FIG. 9 is a "Copy Form Job" form by which copies of forms can be specified, in accordance with a preferred embodiment of the method of the invention.

DETAILED DESCRIPTION OF THE PREFERRED EMBODIMENTS

Figure 2:
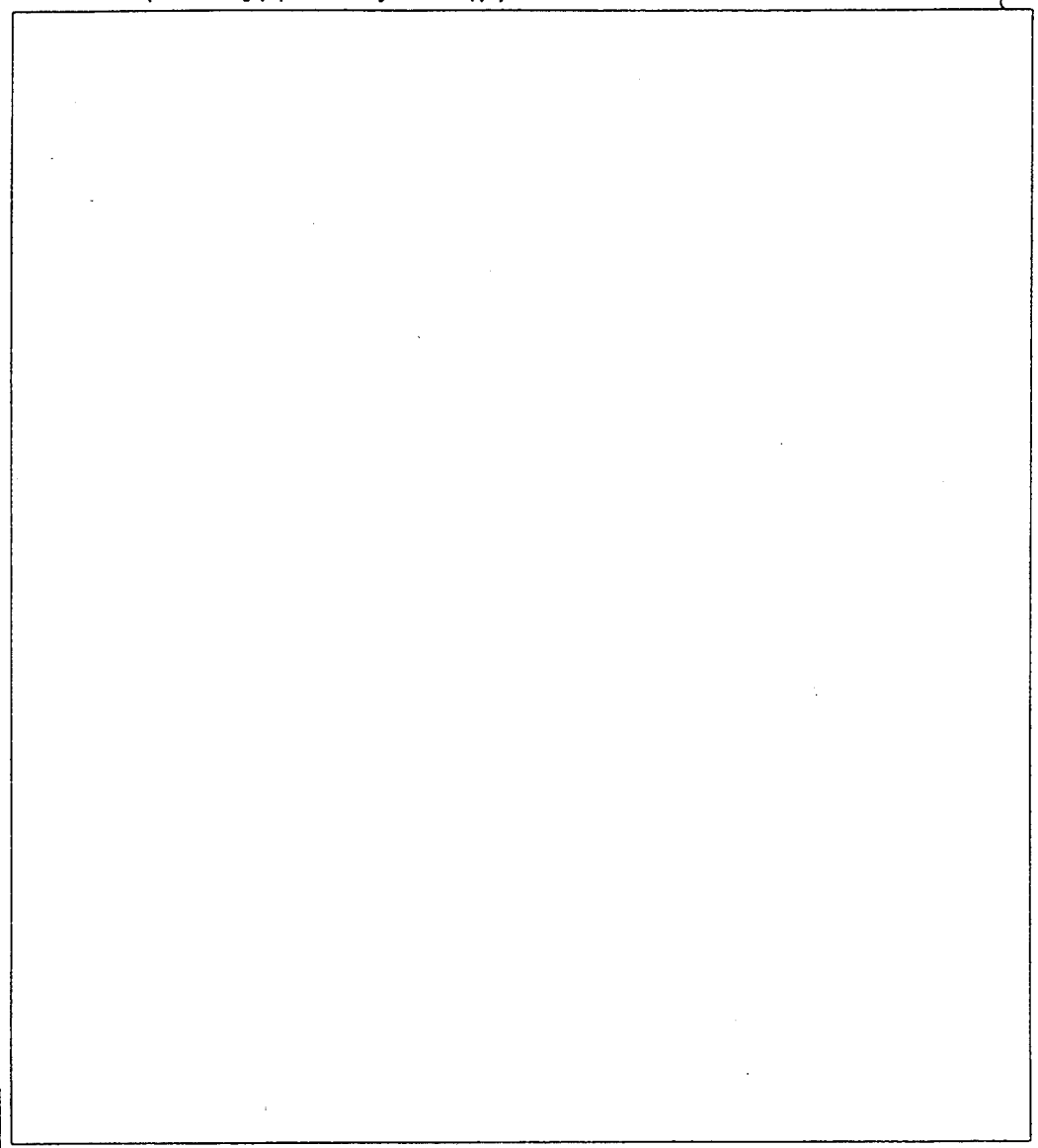
FIG. 2 is an example of a "Cut Image" form, in accordance with a preferred embodiment of the method of the invention.

Demand printing involves substantial job retrieval and setup time. This can be reduced with paper user interfaces that encode information as to the location and setup of reprographic system jobs. Such paper user interfaces can be included as cover sheets when documents are first printed. Subsequently, the cover sheets can be used as "virtual documents" that allow the user to bypass the work station interface and automatically access and setup demand printing jobs.

Thus, in accordance with the invention, paper user interface forms are provided for use in reprographic systems, such as copiers, or the like. Paper user interfaces are documents containing marks that indicate commands when scanned and recognized. Examples of paper user interface forms are set forth in FIGS. 1-6 and 8-13. The interface forms of these figures are referred to hereinafter merely as "forms"

The advent of electronic digital copying has vastly extended the functionality of "copiers," but potentially at the expense of operability. The invention addresses two aspects of this quandary. First, the invention provides forms that enable a untrained user to access the basic functionality of a complicated system reprographic device as easily as one could on a simpler light-lens device. Second, the invention enables the use of paper forms to access some of the more sophisticated image processing capabilities available on contemporary system reprographic devices, such as cut, paste, and mask. Moreover, the invention provides a system reprographic paper user interface that has the potential to simplify the work process of both trained and untrained users.

System reprographics is inherently paper oriented, and instructions for system reprographic tasks are already often in paper form, whether in self-stick removable-type notes on the document itself, or instruction forms for a centralized system reprographic operator. Thus, for example, according to the invention, user instructions can be printed on self-stick removable notes, such as the notes identified by the trademark "Post-it" of 3M Company of St. Paul, Minn. for input directly into the reprographic system. Paper user interfaces should therefore integrate easily into existing work practices of most users. They also have the potential of reducing error by enabling instructions to be made directly to the copier, eliminating the need to communicate instructions through a system operator.

The paper user interface of the invention is focused on two common systems reprographics operations: 1) the selection of copy job options and 2) the selection of image fragments for manipulations, such as cut, paste, or the like. Accordingly, section of options is primarily provided by allowing the user to check boxes on a paper form. For example, a "Basic Copy Job" form, as shown in FIG. 1, allows the user to select typical light-ens copier options such as quantity, sides and reduce/enlarge.

Figure 1:
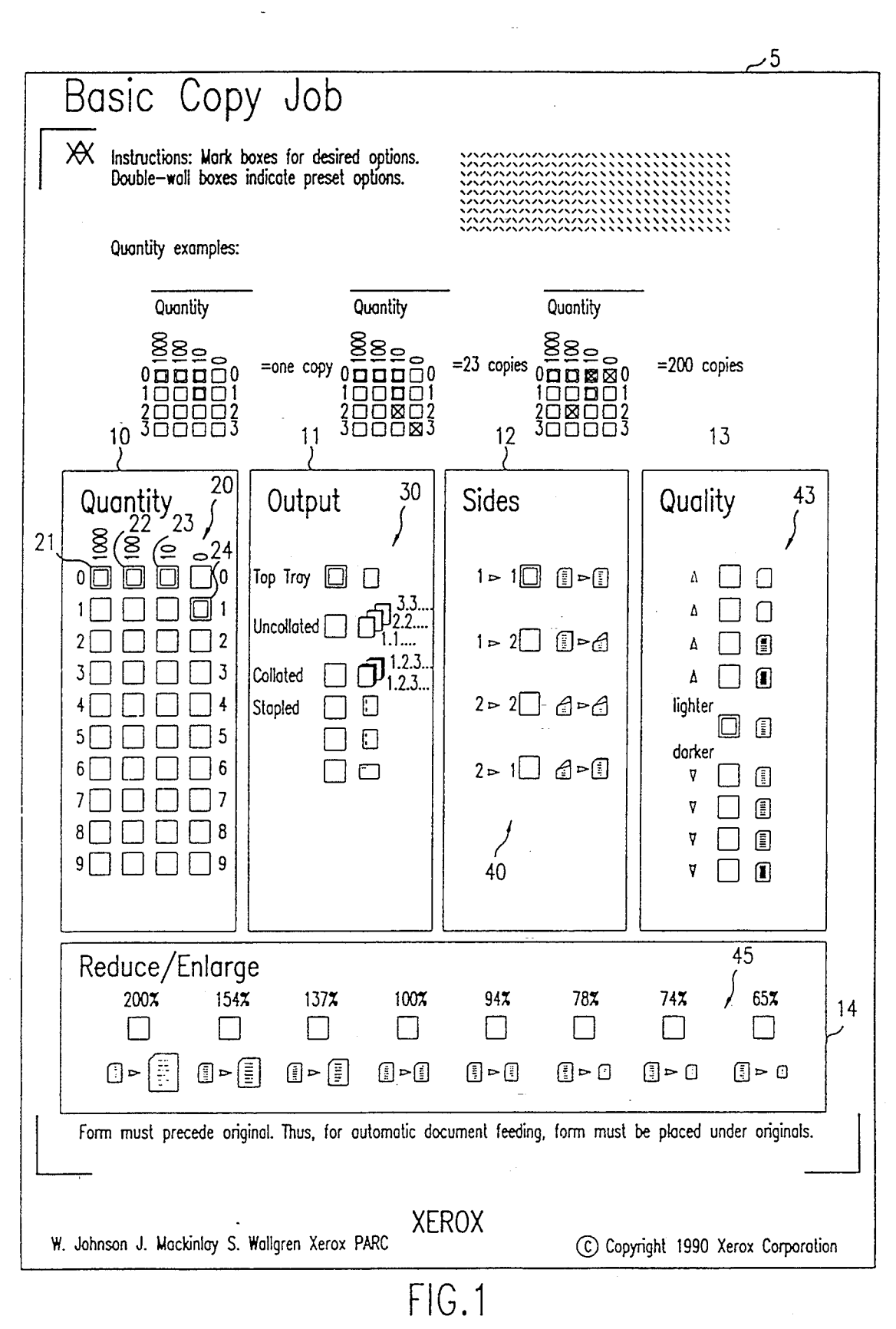

The "Basic Copy Job" form 5 of FIG. 1 includes a number of boxes 10–14, each of which includes a set of boxes that can be checked or marked by the user to specify typical copier machine instructions. For example, box 10 includes a plurality of small boxes 20 that can be checked to indicate the quantity of output documents to be produced from each original input document. In the embodiment illustrated, four of the boxes 21, 22, 23, and 24 have smaller boxes contained therewithin to provide a default number to the machine to instruct the production one output copy. That is, the machine uses the small box symbol within the boxes 20 in the absence of an instruction from the user for a specified number of copies to be made.

The box 11 similarly contains a number of smaller boxes 30 that can be marked by a user to denote or instruct the machine how the output should be handled. In the embodiment illustrated, the output can be indicated to be collated, uncollated, stapled in various configurations, or merely outputted to the top tray in a default state. The box 12 contains a number of smaller boxes 40 that can be selectively marked by the user to indicate the side or sides of the output document onto which the input document is to be copied. The box 13 includes a number of smaller boxes 43 that can be marked by the user to indicate the lightness or darkness desired of the output document. Finally, the box 14 includes a number of smaller boxes 45 that the user can mark to indicate a percentage of reduction or enlargement of the original on the final output document.

Figure 7:
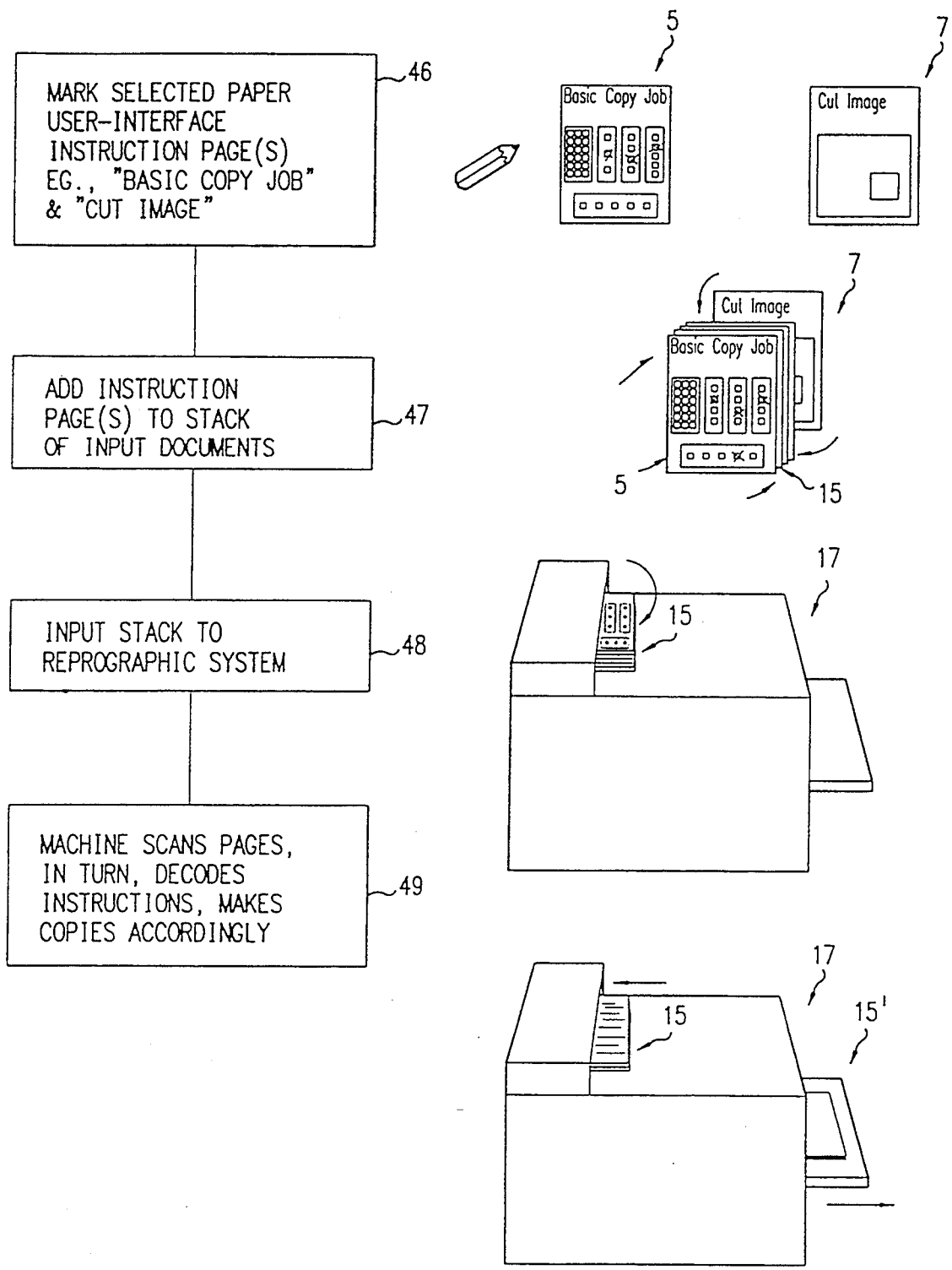
FIG. 7 is a block and pictorial sketch showing the general steps of the method for using the paper-user interface forms, in accordance with a preferred embodiment of the invention.
Figure 10:
FIGS. 10, 11, 12 and 13 are samples of self-stick removable notes that can be used respectively for "Cut Image", "Paste Image", "Crop/Mask", and "Crop/Mask 2", in accordance with a preferred embodiment of the method of the invention.
Figure 11:
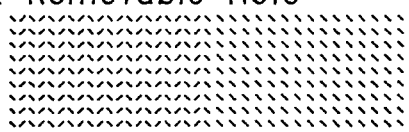

In use, with reference to FIG. 7, after the "Basic Copy Job" form 5 of FIG. 1 is marked 46, it is added 47 to the stack of input documents 15. The entire stack is then fed 48 into the reprographic system 17 prior to any input documents to be copied. The machine scans 49 the "Basic Copy Job" form of FIG. 1 and decodes the instructions contained within the boxes 10–14. As noted, various default instructions are set forth in the box sets 20, 30, 40, 43, and 45 for use by the machine in the absence of specific instructions by the user. On the other hand, if the user has marked any of the boxes 10–14, the marks are decoded and copies 15' are made in accordance therewith.

With reference now to FIG. 2, selection of image fragments is enabled by allowing the user to place a "Cut Image" form over the original and trace around the desired fragment. An example of a "Cut Image" form 7 is shown in FIG. 2. The "Cut Image" form of FIG. 2 provides a blank window 50 that can be placed over the original document to enable the user to draw a rectangle (or other shape) around the area of the original document desired to be cut. When the "Cut Image" form is read by copier, the copier decodes the encircled portion and when the input document is subsequently scanned, the portion within the scanned portion is cut therefrom. Thus, with reference again to FIG. 7, the "Cut Image" form 7 also can be emplaced at a desired location within the stack 15 of input documents prior to loading into the reprographic system 17. The operation of other instruction forms, such as those described below can be similarly used.

The "Cut Image" form 7 additionally provides a box to allow the user to check for the event that the portion to be cut does not fit within the window 50. In that event, an additional blank sheet is used in communicating instructions to the machine, in particular, the identification of the periphery of the portion of the input document to be cut.

The "Cut Image" form can be labelled, if desired, by using a user selectable label box set 52, shown at the lower left corner of the window of the "Cut Image" form, as shown in FIG. 3. Thus, it is possible to prepare multiple sets of labelled cut images for combination with each other or other images, as desired.

Figure 4:
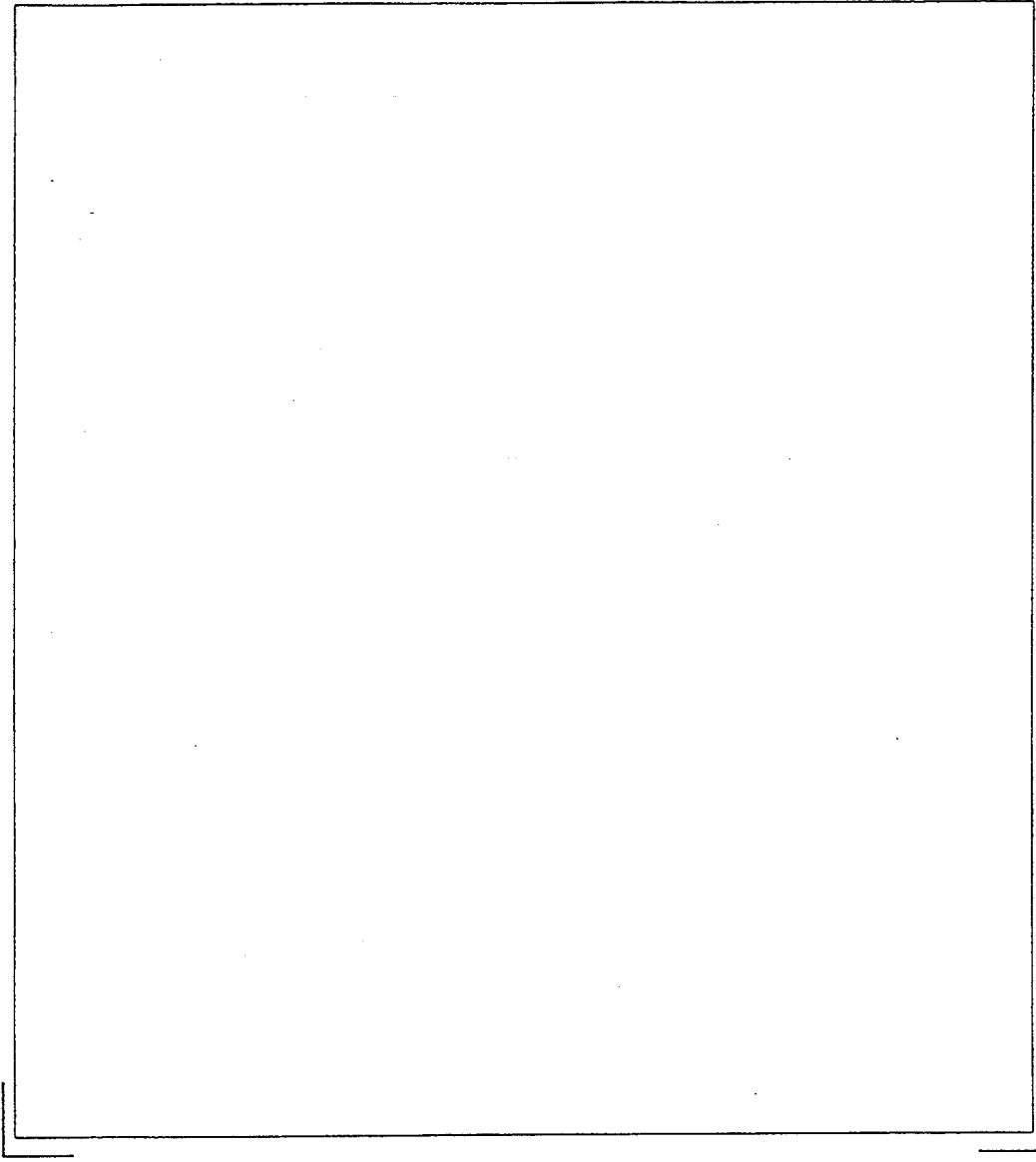
FIG. 4 is an example of a "Paste Image" form, in accordance with a preferred embodiment of the method of the invention.

The image cut can then be pasted onto an output document, as directed by a "Paste Image" form, an example of which being shown in FIG. 4. The "Paste Image" form of FIG. 4, like the "Cut Image" forms of FIGS. 2 and 3 presents a window 60 within which the user can draw or trace a rectangle over an input document to define the location at which a previously Cut Image can be pasted. Thus, when a "Paste Image" instruction form is placed above an input document and inputted into a reprographic system, the "Paste Image" form is scanned and decoded so that upon subsequent scanning of the input document, the portion of the input document within the boundary lines indicated by the user is not reproduced, but, instead, the image demarked in a previously "Cut Image" form is reproduced.

For example, to select an image of a bar chart from a first input original document, a "Cut Image" form (FIGS. 2 or 3) can be used to specify or delimit the chart to be cut from the original document. A subsequent "Paste Image" form, described in FIG. 4 can be used to indicate or specify where the bar chart should be added or inserted in a second input document. An output document is then produced containing the portions specified of the images of both the first and second input documents.

If desired, additional instructions can be included on the "Paste Image" form, such as a specification of an image labelled in a preceding "Cut Image" form, shown in Box 62 of the "Page Image" form shown in FIG. 5. A scale adjustment instruction box 63, a position adjustment instruction box 64, a rotate instruction box 65, or the like. The various instruction boxes 62-65 also have default instructions indicated, as shown.

Similar image processing operations can be performed, such as a "Crop" or "Mask" function. For this purpose, a "Crop/Mask" form is provided, as shown in FIG. 6. The "Crop/Mask" form of FIG. 6 includes a window 70 in which the user can draw a line for a crop operation or a rectangle for a mask operation. After the "Crop/Mask" form of FIG. 6 has been inputted into a reprographic system, the next input document (or documents as indicated in an extent box 72) will be cropped or masked as desired.

Figure 8:
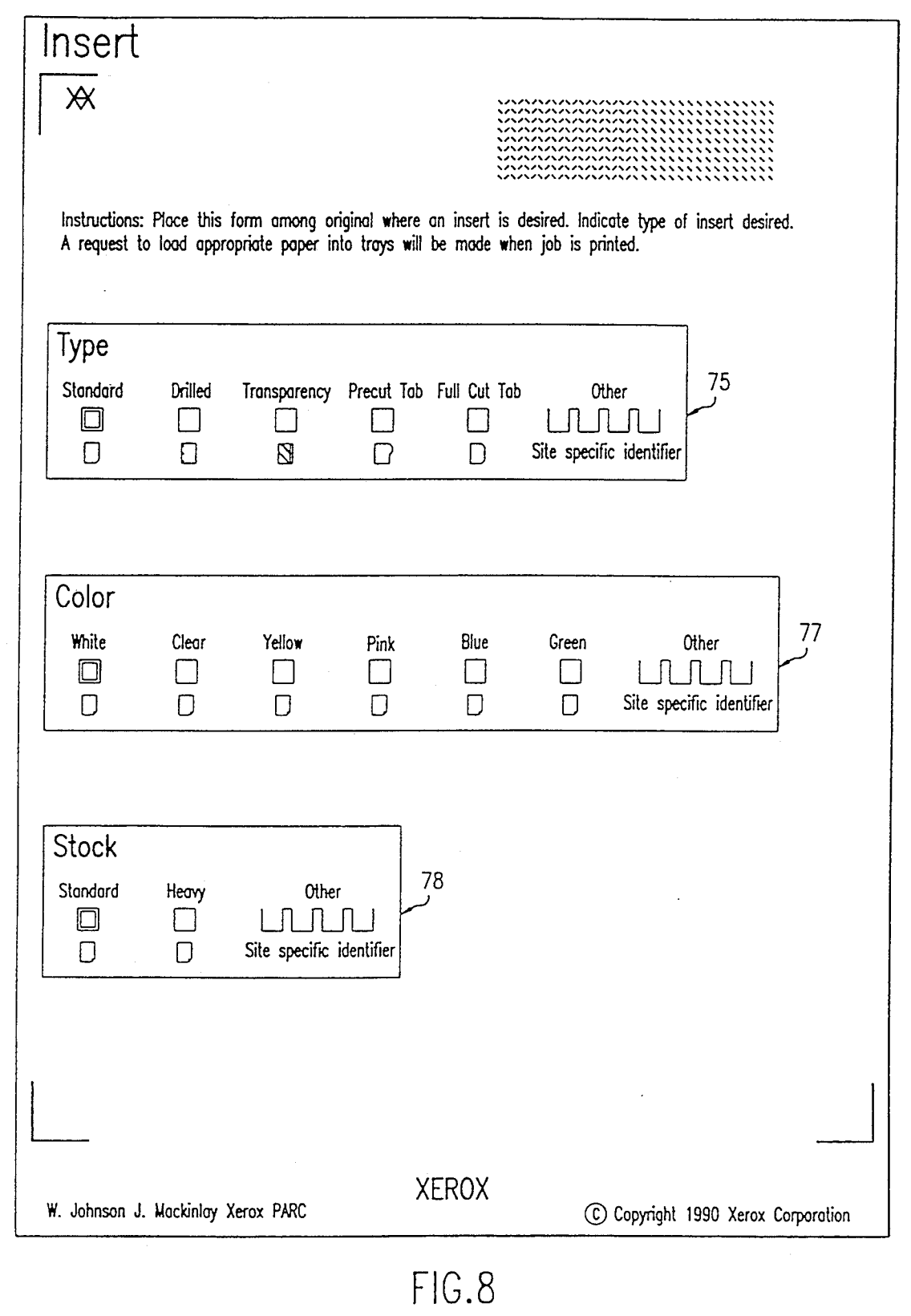

In addition to specific instructions regarding text manipulation, other instructions for producing output documents of specified type, quality, etc. can be inserted using an "Insert" form, an example of which is shown in FIG. 8. The "Insert" form of FIG. 8 includes boxes 75, 77, and 78, respectively to indicate the type, color, and stock of the output document to be produced. If the reprographic system with which the "Insert" form of FIG. 8 has an ability to perform character recognition, specific alpha-numeric characters can be provided for decoding if the predefined type, color, and stock choices are insufficient for the particular application required. Moreover, additional instruction blocks that identify special modes of operation, for example, reproduction of photographs or half-tones, can be implemented.

As implicit in the description above, the user interface forms that are described are not themselves actually copied or reproduced. The forms merely present instructions to the machine with which they are used regarding image manipulation and output document specification. If actual copies of the user interface forms are desired, a special instruction needs to be made to the machine to indicate that the user interface form is not to be used as an instruction carrier or conveyance, but the image of which is to be reproduced. Thus, a "Copy Form Job" form is provided, as shown in FIG. 9. The "Copy Form Job" form of FIG. 9 has user selection boxes 80-85 to indicate which of the standard user interface forms are to be reproduced, and a box 87 to indicate the desired quantity. If other non-standard or site specific forms are required, a box 89 is provided in which the form identity number can be entered in alpha-numeric characters.

An advantage of the paper user interface is that the use of self-stick removable notes carrying the various instructions is enabled. Examples of the "Cut Image", "Paste Image", "Crop/Mask", and "Crop/Mask 2" forms are shown respectively in FIGS. 10, 11, 12, and 13. The various user selection boxes of the self-stick removable notes of FIGS. 10-13 are similar to those described above with respect to the corresponding full page instruction forms. Since the self-stick removable note form of the instruction forms requires that the note be attached to an input document, either the original input document itself or to a blank page indicating regions for image manipulation in a subsequent input document, the placement of the self-stick removable notes needs slightly more care than required of full page instruction sheets. Nevertheless, the self-stick removable notes offer considerable convenience and efficiency in obtaining copies and image manipulation from that previously attainable.

Figure 12:
Figure 13:

It is noted that the "Crop/Mask" form of FIG. 12 and the "Crop/Mask 2" form of FIG. 13 perform essentially the same function, but illustrate the possibility of variations and flexibility of the self-stick removable note format for user interface possibilities.

It will be appreciated that paper interfaces enable batching and queuing of "copy" jobs, thus separating the time of the user from actual processing time. This works at both the individual and system reprographic department level. For instance, individuals can specify their copy jobs at their own desk, then simply drop the jobs into a document handler of their department system reprographic machine for batch processing. Time would not be wasted while programming the machine or waiting to program the machine.

It will also be appreciated that paper user interface jobs can be submitted by anyone. System reprographic departments would only have to specify a copy job once with the customer and not again when programming the system reprographic machine. This avoids transcription and communication errors. Furthermore, the movement of copy jobs through the department would be simplified. Copy jobs could be batch processed through the system reprographic machines, which would only need to be tended to refill paper or fulfill special job requirements.

Paper command sheets can be combined naturally with copy job originals to specify job requirements. For example, customers could include forms exactly where inserts should be placed, or images pasted. An input stack would thus become a representation of the desired output, making job specification clearer and less prone to error.

System reprographic print engines often operate at higher throughput than their input terminals. Networked system reprographic devices are able to accept images scanned anywhere. This enables users to drive system reprographic devices from small, inexpensive, "interface-free" scanners located on their desk tops, using paper forms as the interface. Additionally, it enables multiple input sources for the system reprographic device, increasing the throughput without occupying the local scanner of the device.

It should be emphasized that the invention contemplates more than the full-page forms and self-stick removable note commands described hereinabove. For example, paper user interface commands for image manipulation that require more sophisticated recognition technology can be easily provided. For instance, handwriting recognition can be provided that can replace the forms described above. Thus, for example, a single self-stick removable note can be used to demark a blank sheet of paper where written commands are placed next to tracings to specify image manipulations. The self-stick removable note, in fact, might not even be required. Or, alternatively, special marks that can be put directly on originals without affecting their quality can be used. For example, the marks might be made with an ink that is easily removed or only seen under special lighting. Other such modifications will be apparent to those skilled in the art.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention.

We claim:

1. A method for interfacing image manipulation instructions from a user to a system reprographic device to produce an output document having an output image comprised of a cropped portion of an input image from an input document, comprising the steps of:

providing an instruction page containing user selectable image processing commands on cropping an input image from an input document;

operating said system reprographic device to scan said instruction page with a scanner;

decoding the image processing commands contained in said instruction page;

scanning an input image from an input document with the scanner; and producing an output document having an output image in accordance with the decoded image processing commands, said output image comprising a cropped portion of the input image scanned from the input document.

2. The method of claim 1, wherein the step of providing an instruction page comprises providing a self-stick removable instruction page that can be attached to the input document containing the input image, and further comprising the step of:

attaching the self-stick removable instruction page to the input document.

3. The method of claim 2, wherein said self-stick removable instruction page includes machine readable glyphs on the instruction page specifying user selectable image manipulation instructions.

4. The method of claim 3, wherein said machine readable glyphs contain default image manipulation instructions that are effective in absence of user selections.

5. The method of claim 1 comprising the further step of:

marking the instruction page to indicate the portion of the input image from the input document to be cropped.

6. The method of claim 1, further comprising the step of:

marking the input document with erasable ink to indicate the portion of the input image to be cropped.

7. The method of claim 1, further comprising the step of:

marking the input document with an ink that is not visible unless illuminated by a special light to indicate the portion of the input image to be cropped.

8. A method for interfacing image manipulation instructions from a user to a system reprographic device to cut and paste input images to produce an output document having at least one output image including at least one cut image, comprising the steps of:

marking at least one cutting instruction page containing user selectable image processing commands to provide instructions on cutting at least one image from at least one input document;

scanning the at least one cutting instruction page with a scanner;

decoding the image processing commands contained in the at least one cutting instruction page;

scanning at least one input document with the scanner;

marking at least one pasting instruction page containing user selectable image processing commands to provide instructions on pasting at least one cut image to form an output document having at least one output image that includes at least one cut image;

scanning the at least one pasting instruction page with a scanner;

decoding the image processing commands contained in the at least one pasting instruction page; and producing an output document in accordance with the decoded image processing commands, the output document having at least one output image that includes at least one cut image.

9. The method of claim 8, wherein the at least one output image includes at least two input images cut from the same input document.

10. The method of claim 8, wherein the at least one output image includes at least two input images cut from different input documents.

11. The method of claim 8, wherein the at least one cutting instruction page comprises a self-stick removable instruction page, and further comprising the step of:

attaching the at least one cutting instruction page to the at least one input document before the at least one input document is scanned.

* * * * *